United States Patent [19]

Lace

[11] 4,034,925
[45] July 12, 1977

[54] FRONT DRIVE CARTRIDGE-TAPE PLAYER SYSTEM WITH FAST FORWARD AND REVERSE MODES

[75] Inventor: Melvin Arthur Lace, Prospect Heights, Ill.

[73] Assignee: Motorola, Inc., Schaumburg, Ill.

[21] Appl. No.: 563,947

[22] Filed: Mar. 31, 1975

[51] Int. Cl.² .......................................... B65H 17/48
[52] U.S. Cl. .......................................... 242/55.19 A
[58] Field of Search ..... 242/55.19 A, 55.3, 55.19 R

[56] References Cited

U.S. PATENT DOCUMENTS

| | | | |
|---|---|---|---|
| 3,322,360 | 5/1967 | Roys | 242/55.19 A |
| 3,438,591 | 4/1969 | Becker et al. | 242/55.19 A |
| 3,489,362 | 1/1970 | Linning | 242/55.19 A |
| 3,708,135 | 1/1973 | Lace | 242/55.19 A |
| 3,894,699 | 7/1975 | Bara | 242/55.19 A |

Primary Examiner—Robert I. Smith
Attorney, Agent, or Firm—James W. Gillman; Donald J. Lisa; James P. Hamley

[57] ABSTRACT

A reversible continuous loop cartridge includes a conventional front accessible pressure roller drive. A first pulley is affixed to, and rotatable with the roller. A second pulley is coupled through a one way clutch to the cartridge hub. An O ring interlocks the two pulleys, whose diameters are in a predetermined ratio. When driven in the forward direction the roller, and pulley rotate but the clutch decouples the hub whereby the tape is driven in the well known manner. When reversely driven the clutch engages such that the roller, pulleys, and hub rotate. The hub drive assures proper reverse operation of the continuous loop tape.

A fast forward cartridge tape player includes the conventional cartridge receiving cavity and cylindrical capstan. The capstan is rotatably driven about its vertically positioned longitudinal axis by a motor actuated flywheel, and it is located to forcibly engage the cartridge pressure roller on cartridge insertion into the cavity. Crescents, having a concave face, a convex face, and a vertical dimension are positioned to rotate about the capstan. The concave face encircles greater than 180° of the capstan circumference while revealing a substantial arc on the capstan surface. The convex face is of predetermined curvature providing a desired fast forward speed/normal speed ratio. The vertical dimension of each crescent is fixed to allow each crescent access to the pressure roller.

27 Claims, 45 Drawing Figures

FRONT DRIVE CARTRIDGE-TAPE PLAYER SYSTEM WITH FAST FORWARD AND REVERSE MODES

BACKGROUND OF THE INVENTION

This invention relates to continuous loop cartridges and cartridge players, and particularly to means for effecting fast forward or reverse drive for the same.

Continuous loop tape cartridge player systems are well known in the art. Basically, the cartridge is comprised of a hub, a platen, a pressure roller, and guiding means to guide a continuous loop of tape. The tape is wound about the hub and guided through a front access around the pressure roller. The tape player is provided with a vertically standing capstan which is rotatably driven off a motor actuated flywheel. The capstan is located such that on cartridge insertion into the player the capstan forcibly engages the pressure roller thus rotatably driving the roller. The tape, being pinched between the pressure roller and capstan, is thereby driven. Normally, such players have only been used to drive the tape in a forward direction whereby tape is pulled out from the inner loop of the hub and returned to an outer loop about the hub.

Two serious limitations to the continuous loop tape player combinations have impeded its popularity. First, there has been no known good way to actuate a fast forward mode of operation. It is not uncommon for a listener of tape to wish to race ahead to more important program material. To do this, clearly, requires increased capstan rate of rotation. It is known in the art to increase the motor speed, however this significantly reduces the motor's life. A second drawback has been that tape cartridge players are generally not reversible. A listener might wish to play back something he has just heard, and, with conventional systems he would have to wait for the entire tape to play before he would get to the desired material. Non-reversibility has also limited introduction of 8-track player-recorder combinations since recording requires reversibility to be practical.

While recent innovations have taught means for accomplishing a reverse mode in tape cartridge systems, such systems have had significant drawbacks. In a pending application to Bara (Ser. No. 379,293) it was taught that a tape cartridge may be reversely driven by providing active drive to the cartridge hub itself. In Bara's embodiment, an additional access hole is provided in the cartridge housing which allows a drive member from the player access to the cartridge hub. In the reverse mode the player drive member advances into the access and forcibly engages the hub causing the hub to be driven with the member. In a second approach to a reversible continuous loop cartridge, jointly invented by Pelllatier and myself, (Ser. No. 491,431), means are disclosed for providing a side access to the cartridge whereby a drive member from the player is allowed access to drive a hub from the side. In both prior art reversible cartridge systems, additional access openings are required into the cartridge, resulting in increased cost to manufacture and the possibility of reduced cartridge reliability due to the entrance of foreign matter. Furthermore, the player drive in such systems, especially Bara, is costly to manufacture.

SUMMARY OF THE INVENTION

It is an object of the invention, therefore, to provide a cartridge tape player system providing fast forward and reverse drive modes of operation.

It is a further object of the invention to provide a continuous loop tape cartridge capable of being reversely driven from the front access pressure roller.

It is yet another object of the present invention to provide a means for effecting fast forward in a cartridge tape player without requiring increased tape player motor speed.

It is yet another object of the present invention to provide a fast forward or fast reverse tape player which requires a minimum of parts, is simple to manufacture, and is reliable in use.

Briefly, a fast-forward reverse continuous loop tape playing system includes a cartridge and a player. A cartridge is comprised of a housing having a base portion and a front wall portion. The front wall portion is provided with a front access cavity. A hub is rotatably located on the base, and a pressure roller is rotatably located on the base and engageably accessible through the front access for rotatable drive in a forward or reverse direction. A continuous loop tape is wound on the hub and routed around the pressure roller to be driven therewith. The tape is driven in the forward direction by being removed from the inner convolution of the hub and returned to the hub at the outer convolution.

The cartridge is further comprised of a means for coupling the rotational movement of the pressure roller to the hub when the pressure roller is driven in the reverse direction, and decoupling the rotational movement of the pressure roller from the hub when the pressure roller is driven in the forward direction.

The player is comprised of a housing provided with a cartridge receiving cavity. A cylindrical capstan is rotatably driven about its longitudinal axis by a motor actuated flywheel. The longitudinal axis of the capstan is in a vertical plane and the capstan is predeterminedly positioned to engage the pressure roller of a received cartridge.

The player further comprises a plurality of crescents rotatable about the capstan. Each crescent has an inner face, an outer face and a vertical dimension. The inner face is formed to encircle greater than 180° of the capstan's circumference while revealing a substantial arc on the capstan surface. Both the outer face and the vertical height are of predetermined dimensions. A means is operable in a first mode to decouple capstan rotation from the crescents and is further operable in a second mode to rotatably connect the crescents to the capstan. An aligning means is operable in the first mode to align the crescents such that the capstan surface is forcibly engagable by the pressure roller and is operable in the second mode to sequentially align the crescents such that the outer faces form a substantially circular configuration in a horizontal plane perpendicular to the axis of the capstan. Finally, the player includes a means for selecting either the first or the second mode.

DETAILED DESCRIPTION OF PREFERRED EMBODIMENTS OF THE INVENTION

Figure 1A:
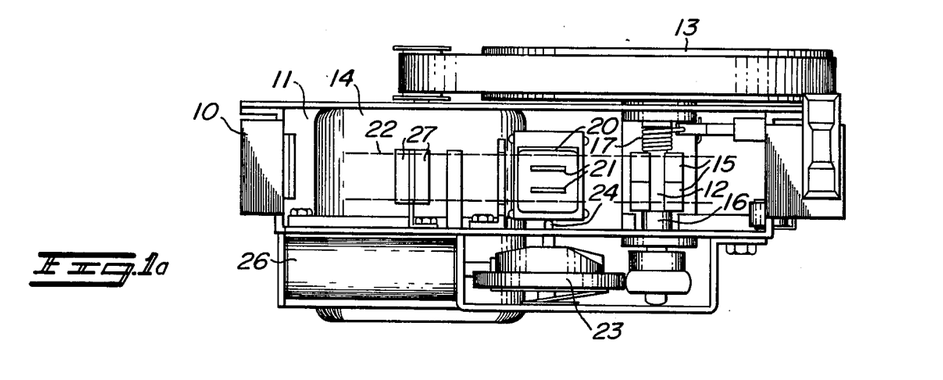
FIG. 1 illustrates two views of a cartridge-player combination according to the present invention.

Referring to FIG. 1, FIG. 1a illustrates the end view of a tape player. The player is comprised of a housing 10 provided with a cartridge receiving cavity 11. A cylindrical capstan 12 is located in a vertical plane and positioned at the end of the cavity to forcibly engage the pressure roller of an inserted cartridge. The capstan is connected to and driven by a flywheel 13 which in turn is rotatably actuated by a motor 14. The capstan is further provided with two crescents 15, running on a bearing 16, and a spring clutch 17, all of whose functions are described herein below. The motor, and thus the flywheel and capstan may be driven in either a forward or reverse direction dependent upon the direction of current through the motor winding.

A tape head 20, provided with pickups 21, is located in the housing 10 to be in alignment with magnetic tracks of an inserted tape cartridge. Shown in dotted lines at 22 is the alignment of the tape of an inserted tape cartridge during player operation. As the tracks on the tape pass the pickups, the pickups produce an output electrical signal representative of the recorded matter on the tape. These signals are in turn amplified and reproduced in a well known manner. The tape head may be indexed to various positions via the indexing means 23 comprised of a pin 24 extending vertically from the top surface of the head which engages a cam 25. The cam has various engaging surfaces which when rotated via solenoid 26 cause the pin, and thus the head, to locate at a predetermined position. Thus, when it is desired to change the pickup position the solenoid 26 relocates the cam 25 thus repositioning the head 20 with respect to the tape 22.

Also shown is an end of tape sensor 27 comprised of a pair of metallic pickups located to be in contacting alignment with the tape 22. As a metallic element (not shown) on the tape 22 signals the end of the recorded matter on the tape, the sensor 27 creates an output signal suitable for resetting the head indexing means 23.

Figure 1B:
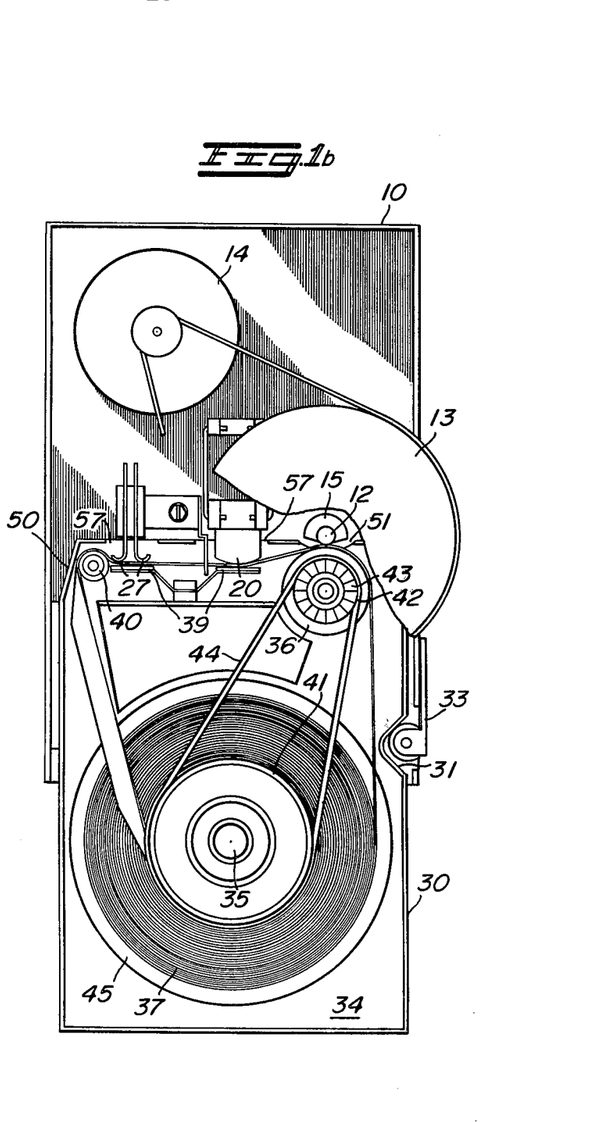

Referring now to FIG. 1b, it is seen that a tape cartridge 30 is inserted in the tape player. Shown is the player housing 10 including a motor 14 which actuates a flywheel 13 which in turn rotatably drives a capstan 12. Located on the capstan are a pair of crescents 15. The cartridge 30 is provided with a notched cutout 31 which is forcibly engaged by a spring and roller assembly 33 affixed to the player housing 10. The assembly forces the cartridge in locking engagement in the housing.

Located within the cartridge housing 30 is a base portion 34 and a front wall portion 50. The front wall portion 50 is provided with front access cavities 57 for the end of tape sensor 27, the tape head 20 and front access cavity 51 for the capstan 12. A hub 35 is rotatably mounted to the base 34 of the cartridge housing 30. A platen 45 is rotatably mounted between the hub 35 and base 34. Also, a pressure roller 36 is rotatably mounted to the base 34. A continuous tape loop 37 is wound on the hub 35 and is further routed via guide 40 past the front access cavities, and a pair of pressure pads 39, and around the roller 36. The capstan 12 is seen to forcibly engage the pressure roller 36 whereby rotational movement of the capstan is coupled to the pressure roller. As the tape is pinched between the capstan and pressure roller the tape similarly is driven. When driven in the forward direction the tape is removed from the hub 35 at an inner convolution routed by the access cavities and the pressure roller and returned to the hub at an outer convolution.

A pulley 41 is permanently affixed to the hub for rotation therewith. A second pulley 42 is coupled to the pressure roller 36 via a spray clutch 43. The clutch 43 operates to couple the pressure roller 36 to the second pulley 42 when the roller is driven in the reverse direction, the clutch otherwise decouples the pressure roller from the second pulley. An O-ring 44, made of an elastic material such as rubber, is stretched to ride in the pulleys 41, 42 thus coupling rotational movement of one to the other. The pulleys, O-ring, and clutch act as a means to couple the rotational movement of the pressure roller to the hub when the pressure roller is driven in the reverse direction and to decouple the rotational movement of the pressure roller from the hub when the pressure roller is driven in the reverse direction. Thus the capstan acts as a primary drive which in turn engages the driven pressure roller in either a forward or reverse direction. The tape, being routed between the pressure roller and capstan at their engaging interface is similarly driven. The pulleys, O-ring and clutch act as a secondary drive which operates to transfer rotational drive from the pressure roller to the hub when the capstan is operating the pressure roller in the reverse direction and otherwise effectively decoupling the hub from the pressure roller.

Figure 2:
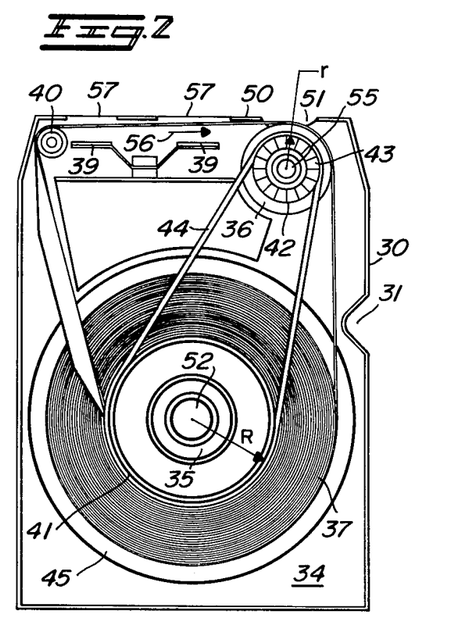
FIG. 2 illustrates a reversible continuous loop cartridge which is driven through the front access.
Figure 3:
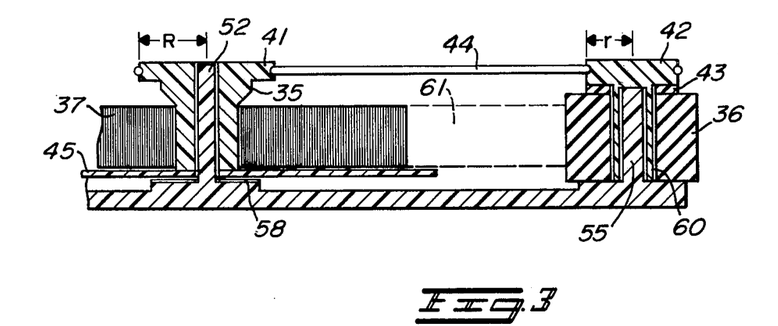
FIG. 3 is a cutaway elevation of the reversible continuous loop cartridge.

The reversible cartridge is better understood with reference to FIGS. 2 and 3.

FIG. 2 illustrates a continuous loop reversible cartridge according to the invention. A housing 30 includes a base portion 34, and a front wall portion 50. The front wall portion 50 is provided with a front access cavity 51 which, as is mentioned with respect to FIG. 1, allows the capstan of a tape player to rotatably engage the pressure roller 36. A notched cutout 31 is provided in the side of the housing which is engaged by the roller spring assembly of the player (not shown). A spindle 52 extends vertically upward from the base 34 of the housing 30. A platen 45 and then a hub 35 are located over the spindle to be rotatably positioned on the base 34. While there is a frictional interface between the hub and platen, one may move independently of the other.

A second spindle 55 also extending vertically upward from the base 34 is provided in the area of the front access cavity 51. Located over the second spindle 55 is the pressure roller 36. As above mentioned the pressure roller may be rotatably driven in a forward or reverse direction from a drive source through the front access cavity 51. A continuous tape loop 37 is wound on the hub 35, and is routed via guide 40 around the pressure roller 36 whereby rotatable drive applied to the pressure roller drives the tape. When the tape is driven in the forward direction, indicated by arrow 56, the tape is removed from the hub 35 at the inner convolution and returned to the hub at the outer convolution. A pair of pressure pads 39 are positioned opposite additional access cavities 57. On cartridge insertion into a tape player the pressure pads 39 force the tape against integral components of the player, such as the tape head and end of tape sensor.

A first pulley 41 is affixed to the hub 35 for rotation therewith. The pulley 41 is of radius R. A second pulley 42, having a radius $r$, is coupled through clutch 43 to the pressure roller 36. The clutch, more fully described with respect to FIG. 3, acts to couple the pressure roller rotation to the second pulley when the pressure roller is driven in the reverse direction, i.e. in a direction opposite to that shown at arrow 56. Otherwise, the clutch decouples rotational movement of the pressure roller from the second pulley. An elastic ring 44 preferably a rubber O-ring, is extended to ride in the pulleys 41, 42, whereby rotational movement of one pulley is coupled to the other.

When the capstan drives the pressure roller 36, and tape 37 in the forward direction the cartridge operates in the well known above described manner. In a reverse drive condition, the pulleys are coupled via the clutch whereby rotational drive is applied from the second pulley via the O-ring to the first pulley and hub. By selecting the ratio of R to $r$ to be between 1.5 to 2.0:1 the hub will rotate at a speed sufficiently exceeding the pressure roller allowing the cartridge to operate properly in the reverse direction. In this reverse mode, tape will pull off at the outer convolution of the tape loop 37 travel past the pressure roller, pressure pads, and guide, and return to the inner convolution of the hub 35. Thus, a reverse mode is effected by driving the pressure roller through a front access cavity in the housing.

A cutaway view of the reversible tape cartridge is illustrated in FIG. 3. Vertically extending upwards from the base 34 is a first spindle 52 and a second spindle 55. The platen 45 provided with a riding surface 58 is positioned over the first spindle 52 to be rotatably located thereat. The hub 35 is similarly located over the first spindle 52 to rotate about the spindle. A frictional interface between the hub 35 and the platen 45 tends to couple a minute amount of rotational drive of one to the other. However, both hub 35 and platen 45 are free to individually rotate. A pulley 41 is affixed to the upper surface of the hub 35 for rotation therewith. The spindle is of predetermined radius R.

Figure 4:
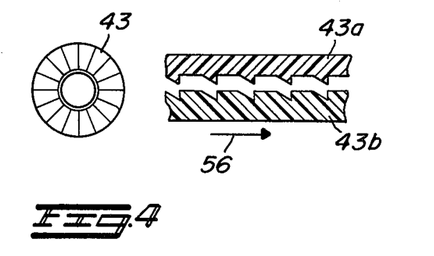
FIG. 4 illustrates a spray clutch used in the reversible cartridge.

Rotatably located over the second spindle 55 is the cylindrical pressure roller 36. The diameter of the centrally located pressure roller hole is considerably larger than the spindle 55 diameter allowing the cylindrical mounting 60 of the second pulley 42 to be located between the spindle 55 and the pressure roller 36. The lower surface of the second pulley is provided with pointed fingers which comprise the male portion 43a of the sprag clutch 43. Provided in the upper surface of the pressure roller and located to be in alignment with the male clutch member 43a are notches forming the female member 43b of the spray clutch 43. The clutch is better understood with reference to FIG. 4 wherein clutch detail is more readily apparent. Due to the configuration of the fingers and notches, when the pressure roller and thus the female member 43b is driven in the forward direction, indicated at arrow 56, there is considerable slippage between the female and male clutch members 43b, 43a, respectively, effectively decoupling the two members and thus decoupling the pressure roller from the second pulley 42. However, when the pressure roller is driven in the reverse direction, i.e. opposite that of arrow 56, the fingers of the male portion 43a lockably engage the notches of the female member 43b thus directly coupling rotation of the pressure roller to the second pulley. Also shown in FIG. 4 is a detail of the male member 43a or female member 43b of the sprag clutch as seen from above.

Returning to FIG. 3, a tape loop is located about the hub 35 and rides on the platen 45. The tape is routed about the pressure roller 36 as is shown by the dotted lines 61. Finally, an elastic ring, preferably an O-ring, is extended to ride in both pulleys, thereby coupling rotational movement of one pulley to the next. The ratio of the radius R of the first pulley 41 to the radius $r$ of the second pulley 42 is approximately 1.52:1. Thus, when the pressure roller is driven in the reverse direction, and therefore the second pulley is driven in the reverse direction, rotational drive from the second pulley will be applied to the first pulley 41 and thereby the hub 35. Due to the increased radius of the first pulley 41 over the second pulley 42 the hub will rotate at an increased speed thus assuring proper operation of the tape cartridge in the reverse mode.

While the preferred embodiment discloses incorporating the one-way clutch between the pressure roller and second pulley, it should be understood that a variation wherein the second pulley is permanently affixed to the pressure roller and a one-way clutch couples the first pulley to the hub is similarly within the scope of the invention.

Figures 5A, 5B:
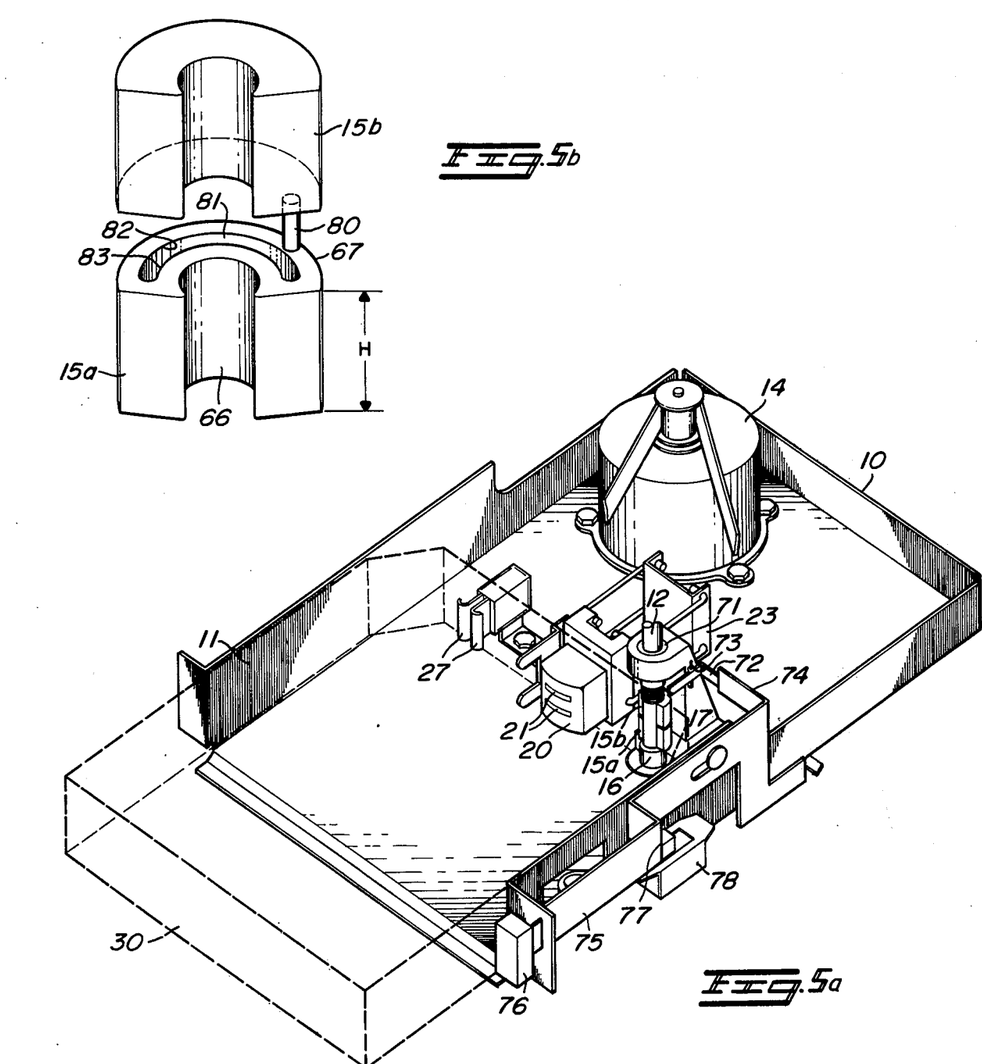
FIG. 5 illustrates the tape player having a pair of crescents.

FIG. 5 illustrates a two crescent tape player which provides normal and fast forward modes of operation. As discussed with reference to FIGS. 1 and 2, the player includes a housing 10. The housing includes a cartridge receiving cavity 11. In the housing at the furthest recess of the cavity are located a tape head 20 having a pair of pickups 21, and a tape end of sensor 27. The tape head is located to align its pickups 21 with recorded track of an inserted tape cartridge 30. Track selection is effected by relocating the pickups with respect to the tracks via a head indexing means 23. It should be noted that the indexing means in this embodiment is slightly different from the one shown in FIG. 1, although both are well known in the art. Also located at the furthest recess of the cavity 11 is a cylindrical capstan 12 whose longitudinal axis is in a vertical plane and which is predeterminedly positioned to forcibly engage the pressure roller of a received cartridge 30. The capstan is rotatably driven about its longitudinal axis by a flywheel (not shown) actuated by a motor 14.

A pair of crescents 15a, b are rotatably located on the capstan for rotation thereabout. The crescents are better understood with reference to FIG. 5b wherein it is seen that the crescents have an inner or concave face 66, an outer convex face 67 and a vertical dimension, or height H. The inner face is formed to slidably contour to and encircle greater than 180° of the capstan circumference. However, a substantial arc on the capstan surface is still revealed. The outer face 67 is an arc of predetermined radius selected to provide a desired fast forward speed. The vertical dimension H is selected such that each of the two crescents has access to an inserted cartridge pressure roller. The first or lower crescent 15a is slidably located on the capstan 12 and is vertically supported by a bearing 16. The upper crescent 15b is located on the capstan and is vertically supported by the lower crescent.

Figure 6A:
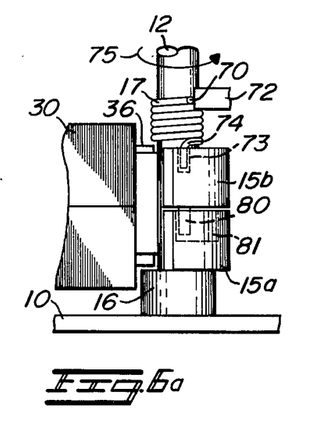
FIG. 6 illustrates sequential operation of the two crescent fast forward systems.

A pin 80 extends downwardly from the lower surface of the upper crescent 15b into a provided slot 81 in the upper surface of the lower crescent 15a. The slot 81 is formed in an arc α and has first and second end walls 82, 83 respectively. A spring clutch 17 (FIG. 6a), substantially cylindrical in shape, has a predetermined diameter to slide over the capstan and has a first end which engages the upper crescent 15b and a second end shown extending outwardly at 70. An upper bearing 71 supports the capstan in the vertical direction. An L-shaped control lever 72 is pivotally mounted from a support pin 73 which extends vertically from the base of the housing 10. The first arm of the control lever 72 is located to engage the second end of the spring clutch 70. The first arm of the L-shaped control lever 72 is positioned to be forcibly engaged by the foot 74 of an actuator bar 75. The bar is slidably located in the side of the housing 10, and has at its head a pushbutton 76 accessible external to the cartridge player. The pushbutton 76 is spring loaded such that the button returns to an outer or rest position when no actuated. In the rest position, the bar 75 acts through foot 74 on the control lever 72 to allow lever 72 engagement with the end of the spring clutch 70. On pushbutton 76 depression, the lever 75 acts through foot 74 to pivot the control arm out of engagement with a spring end 70. Lever and spring clutch operation is further described hereinbelow. An optional second foot 77 extends from the actuator bar 75 and is located to engage an optional electrical switch 78 which is mounted on the side of the housing 10. The switch is wired to the motor 14 whereby in its rest position the switch causes the motor to rotate at its normal speed, and in the actuated position the switch causes the motor to increase RPM.

In its normal mode of operation, the crescents are aligned via the action of the control lever on the clutch spring end 70 such that the revealed surface of the capstan is engageable with the pressure roller of an inserted cartridge. In this mode the pressure roller is driven at a rate dependent upon the motor speed and the capstan radius. When the fast forward mode is desired, i.e. when the operator pushes pushbutton 76, the control lever swings out of engagement with the spring clutch. The diameter of the spring clutch decreases allowing it to forcibly engage the capstan for rotation therewith. As the first end of the upper crescent 15b is affixed to the first end of the clutch, the crescent 15b also rotates with the capstan. After upper crescent rotation of 180°, the pin 80 engages the first end wall 82 of the slot 81 in the lower crescent 15a. The resultant pin to wall engagement causes the lower crescent 15a to similarly rotate about the capstan 12. When viewed downwardly from a point above the axis of the capstan, the outer faces 67 of the crescents form a circular configuration about the capstan having a diameter considerably greater than that of the capstan which has two effects. First the increased diameter acting on the cartridge pressure roller forces the cartridge a slight distance in a direction out of the cartridge receiving cavity 11. This removes the tape from contact with the tape head 20 and end of tape sensor 27 such that in this fast forward mode there is no deleterious rubbing of the tape to tape player components. Also, the increased effective capstan diameter drives the pressure roller at an increased rate. This increased rate is related to the normal rate in proportion to the radio of effective to actual capstan diameters. Further, as electrical switch 78 is in its actuated position, motor speed is further increased thus creating an increased fast forward rate. In a preferred embodiment the electrical switch 78 causes the motor to rotate at twice its normal rate, and the crescents act to increase the effect radius of the capstan by three times. Thus the fast forward rate becomes six times the normal tape player rate.

Exact action of the control lever, spring clutch, and crescents is given hereinbelow, but it should be pointed out that the two crescent fast forward player is suitable for driving any front access tape cartridge, and is not confined to the reversible continuous loop cartridge according to the instant invention.

FIG. 6 illustrates the cycle of fast forward operation. Referring to 6a, the lower crescent 15a is shown mounted on the capstan 12 and vertically supported by a bearing 16 which rests on the cartridge player housing 10. The upper crescent 15b is also slidably mounted on he capstan 12 and is vertically supported by the lower crescent 15a. A pin 80 extending downwardly from the lower surface of the upper crescent engages a slot 81 provided in the upper surface of the lower crescent. As better seen in FIG. 6b, which is a view from a point above the capstan looking down on the crescents, the slot 81 provided in the lower crescent 15a extends for an angle α which in the preferred embodiment is approximately 180°. The slot terminates in two end walls 82, 83. A spring clutch 17 is also located on the capstan. The spring clutch 17 is substantially cylindrical in shape and has a first end 71 and a second end 70. The first end 71 is located and affixed in a slot 73 provided in the upper surface of the upper crescent 15b. The second spring end 70 is located to be engaged by the control lever arm 72.

Figure 6B:
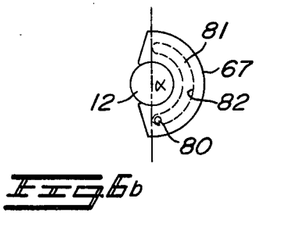

When the capstan is driven in its forward direction, indicated by arrow 75, and when the control arm 72 is in engaging relation with spring end 70, the net forces on the spring clutch 17 provided by the friction between the rotating capstan and the concave face 66 of crescent 15b tend to increase the spring cylindrical diameter thereby decoupling the spring from the rotating capstan shaft. Further, the location of the spring's first and second ends 71, 70 locates the upper crescent 15b such that the revealed surface of the capstan 12 is in engaging contact with the pressure roller 36 of an inserted cartridge 30. In this position, as shown in FIG. 6b, the pin 80 of the upper crescent 15b is located at end wall 83 of slot 81.

Figure 6C:
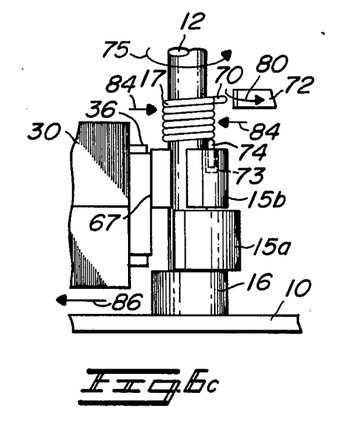
Figure 6D:
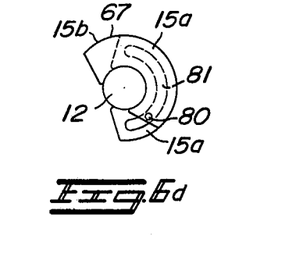

Referring to FIG. 6C, when the fast forward mechanism is operated, the control lever 72 moves in a direction indicated by arrow 80 out of engagement with spring end 70. The coiling action of the clutch spring 17 tends to reduce the spring diameter, as illustrated by arrows 82, and thus the spring frictionally engages and rotates with the capstan 12. As the upper crescent 15b is affixed to the spring 17 via slot 73 and spring end 71, the upper crescent also begins to rotate with the capstan. This rotation moves the outer face 67 of the upper crescent 15b into engagement with the pressure roller 36. The resultant force on the roller and cartridge 30 tends to displace the cartridge in the direction out of the cartridge receiving cavity indicated by arrow 86. FIG. 6D illustrates the initial rotation of the upper crescent 15b, and the movement of the pin 83 within the slot 81 of the lower crescent 15b.

Figure 6E:
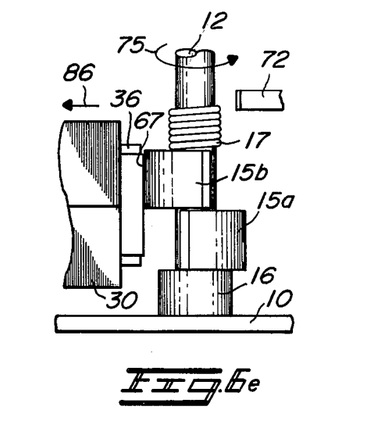
Figure 6F:
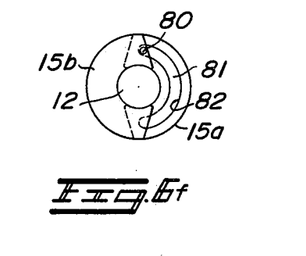

Further capstan rotation is illustrated in FIG. 6E. Here the upper crescent 15b has rotated to a point such that the pin 80 engages the first end wall 82 of the slot 81. This is more clearly shown in FIG. 6F. As is seen in FIG. 6E crescent 15b has deflected the roller 36 and cartridge 38 by an increased effective capstan diameter in the direction 86. As mentioned above, the effect of the increased capstan diameter is two-fold. First, the tape is no longer engaging the tape head and tape end of sensor in the tape player. Thus there is no deleterious wear between the tape and the tape player components. Also, due to the effective increase in capstan diameter the pressure roller is moving at a higher rotational speed. This of course drives the tape faster and effectuates fast forward tape operation. Since the pin 80 is engaging the first end wall 82 the lower crescent is coupled to rotate with the upper crescent. Thus in the fast forward mode the crescents are sequentially aligned such that the outer faces form a substantially circular configuration as viewed from above the axis of the capstan.

Figure 6G:
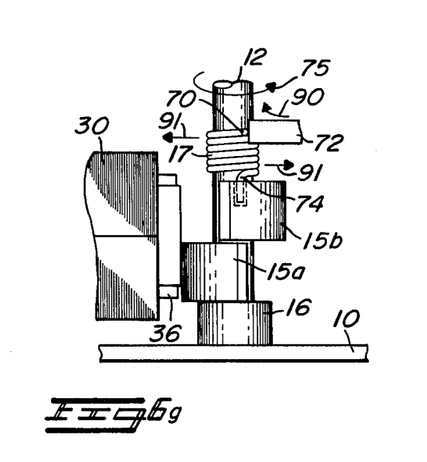
Figure 6H:
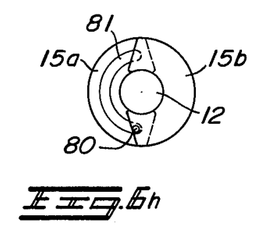

FIGS. 6G and 6H illustrate return to normal playing speed. The control lever 72 is relocated in a direction indicated by arrow 90 in position to engage the second end 70 of the spring clutch 17 while friction tends to continue to drive crescent 15b. The net force on the spring causes spring diameter to increase, indicated by arrows 91, and once again decouple the spring from the capstan. Due to the realignment of pin 70 with the control lever 72, the first spring end 71 realigns upper crescent 15b to reveal the capstan surface to the pressure roller.

Figure 6I:
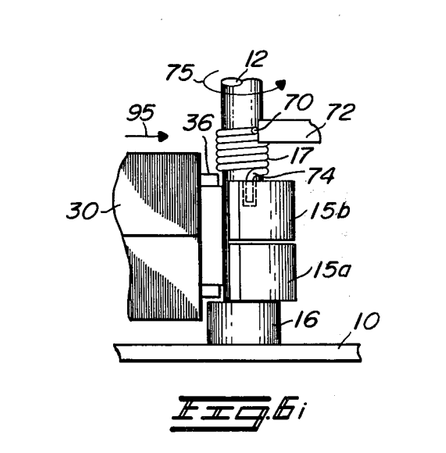
Figure 6J:
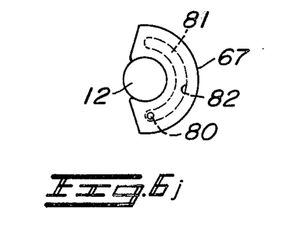

The final position is shown in FIGS. 6I and 6J. The lower crescent is rotated by capstan friction back to its initial position in alignment with the upper crescent. The cartridge is moved in a direction 95 such that the pressure roller 36 is in contacting arrangement with the revealed circuit of the capstan 12.

Thus it is seen that the two crescent system accomplishes fast forward drive in a front access tape cartridge, without having to increase motor speed and thereby decrease motor lifetime.

A second embodiment of a tape player according to the instant invention incorporates three crescent members. This embodiment is illustrated in FIGS. 7 and 8.

Figure 7A:
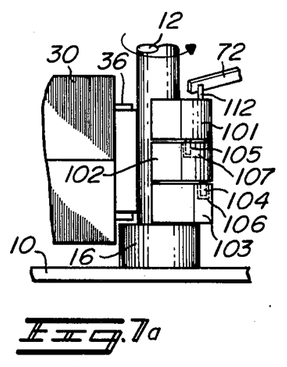
FIG. 7 illustrates sequential operation of the three crescent fast forward-fast reverse system.
Figure 7B:
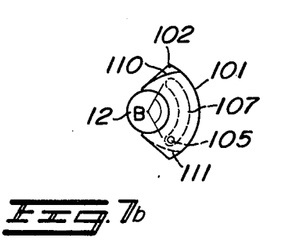

In FIG. 7A it is seen that the three crescent system includes the cartridge housing 10, a bearing 16, a capstan 12, and a control lever 72. Each crescent 101-103 has an inner face and an outer face substantially similar to the two crescent system. However, the vertical height of a crescent in the three crescent system is slightly reduced, such that each crescent is engageable with the pressure roller 36 of an inserted cartridge 30. The lower crescent 103 is rotatably and slidably located on the capstan 12 and vertically supported by the bearing 16. The middle crescent 102 is rotatably and slidably located on the capstan 12 and is vertically supported by the lower crescent 103. Finally, the upper crescent 101 is also rotatably and slidably mounted on the capstan and is vertically supported by the middle crescent 102. The lower surface of the middle crescent 102, and the lower surface of the upper crescent 101, are provided with downwardly extending pins 104, 105 respectively. Pin 104 rides in a curved slot 106 provided in the upper surface of the lower crescent 103. Similarly, pin 105 rides in a curved slot 107 provided in the upper surface of the middle crescent 102. As shown in FIG. 7B, the slots extend to an angle β which is equal to 120°. As with the two crescent system, the slots terminate in end walls. Further, as shown in FIG. 7B the upper crescent is provided with a cam engaging face 110 which is suitably graded for engaging the pressure roller 36 and capstan 12 interface when the capstan is rotatably driven in a forward direction. Similarly, the lower crescent 103 is provided with an engaging face 111 which is suitably graded for engaging the pressure roller and capstan interface when the capstan is driven in a reverse direction.

A third pin 112 is located in the upper surface of the upper crescent 101, and is suitably positioned to be engaged by the control arm 72. There is no spring clutch required in the three crescent system as the system is designed to operate on the frictional forces between the capstan and the concave face of the leading crescent which is sufficient to get the leading crescent rotating. That frictional force is increased by the force of roller 31 and spring 33 tending to push the cartridge 30 inwardly and pressure roller 36 into contact with the capstan 12.

FIG. 7A represents the player in the forward, normal speed condition. The arm 72 engaging the pin 112 locates the upper crescent such that the revealed surface on the capstan is opposite the pressure roller. The remaining crescents are in parallel alignment with the upper crescent such that the pressure roller is contacting the revealed capstan surface.

Figure 7C:
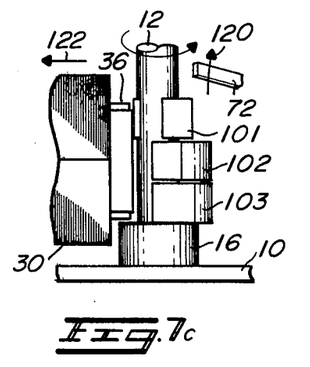

FIG. 7C illustrates the fast forward mode of operation. The control lever 72 is located in a direction 120 to disengage the pin 112. Friction between the capstan and the concave face of crescent 101, the lead crescent in this instant drives the engaging face 110 of the upper crescent 101 into the pressure roller 36 and capstan surface interface at that point the opposing force of spring 33 and 31 increases the aforesaid frictional force such that the upper crescent is pulled and then driven with the capstan. Further, as is shown by arrow 122 the pressure roller and cartridge 30 are driven in a direction out of the cartridge receiving cavity, thus locating the tape out of contacting engagement with various tape player components.

Figure 7D:
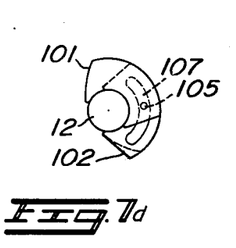

FIG. 7D illustrates a view from above the capstan looking down on the various crescents as the first crescent begins its rotation.

Figure 7E:
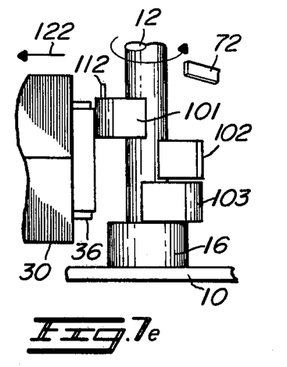
Figure 7F:
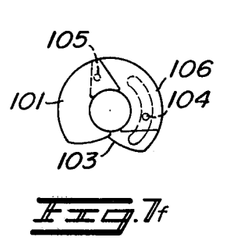

In FIG. 7E the upper crescent 101 has rotated to an angular position such that the pin 105 engages an end wall of slot 107. At this point the second crescent 102 is coupled to rotate with the first crescent 101. FIG. 7F further illustrates the positions of the crescents, and illustrates the location of the middle crescent pin 104 in the lower crescent slot 106.

Figure 7G:
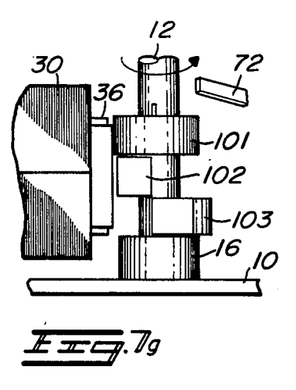
Figure 7H:
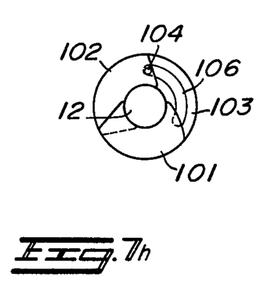

With further rotation, as illustrated in FIG. 7G and 7H, the middle crescent pin 104 engages the end wall of the lower crescent slot 106 whereby the lower crescent is driven with the upper crescents. The relative positions of the pins in slots causes the three crescents to align in a circular configuration as viewed from above as in FIG. 7H. Thus, the effective capstan diameter has been increased providing the required fast forward motion. When the leading crescent 101 is wholly out of contact with the pressure roller, friction between the lower surface of the upper crescent and upper surface of the lower crescent keeps the upper crescent rotating with the capstan to maintain the crescent alignment.

Figure 7I:
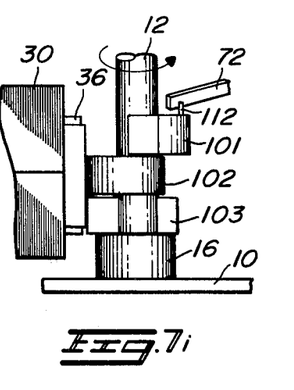
Figure 7J:
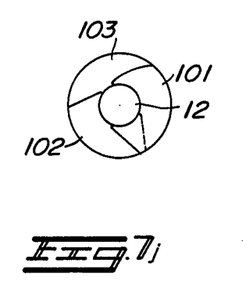

In FIG. 7I the system is activated back to the normal forward mode. The control arm 72 is returned to a position whereby it can engage pin 112. This relocates the upper crescent 101 in a position which reveals the capstan surface to the cartridge pressure roller 36. FIG. 7J illustrates the relative positions of the three crescents as the system returns to normal speed of operation.

Figure 7K:
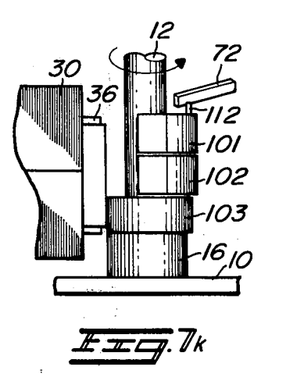
Figure 7L:
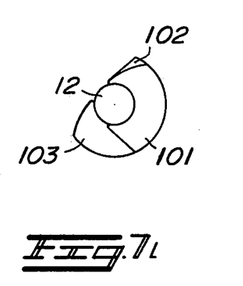

In FIG. 7K it is seen the second crescent 102 has been driven by the frictional forces to its rest position, where it is confined to stay. FIG. 7L illustrates relative crescent positions.

Figure 7M:
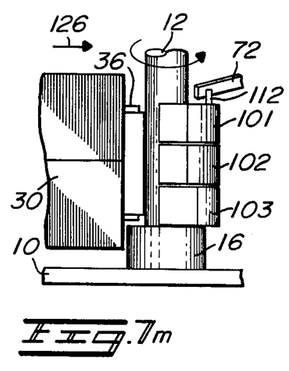
Figure 7N:
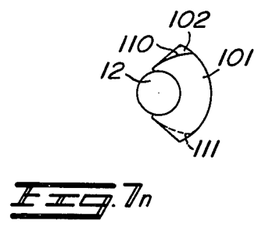

Finally in FIGS. 7M and 7N the lower crescent 103 is frictionally driven to its rest position, and the pressure roller relocating in a direction indicated by arrow 126 is again in contacting relationship to the capstan surface.

FIG. 8 illustrates the fast reverse mode of operation. FIG. 8A is identical to FIG. 7A except that now the capstan is driven in the reverse direction. This may be accomplished, for example, by reversing the current through the D.C. motor and thus reversing the direction of flywheel rotation. In FIG. 8C fast reverse operation is initiated. Again, the control arm 72 is moved in a direction indicated by arrow 120 to disengage from pin 112. Now the engaging face 111 of the lower crescent 103, which is the leading crescent in this instance, engages the pressure roller 36 and capstan 12 interface. Also, as before, the cartridge is translated in a direction 122 such that the cartridge tape disengages the tape player components. FIG. 8D is a further view of a relative position of the three crescents. The frictional force discussed above apply in this sequence too.

Figure 8A:
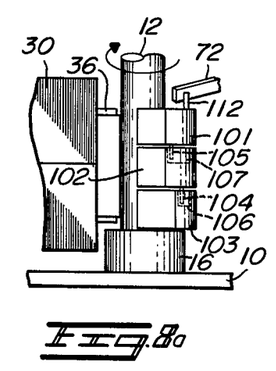
FIG. 8 illustrates the fast reverse mode of operation.
Figure 8B:
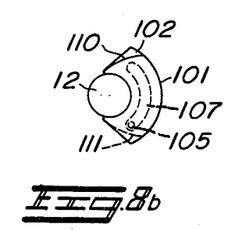
Figure 8C:
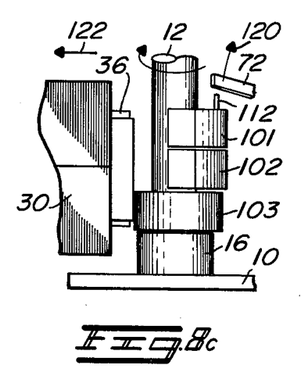
Figure 8D:
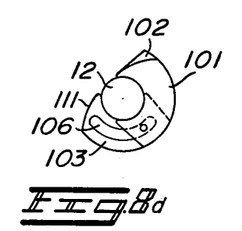
Figure 8E:
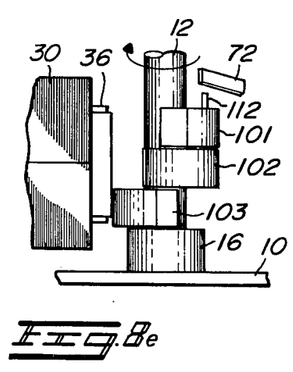
Figure 8F:
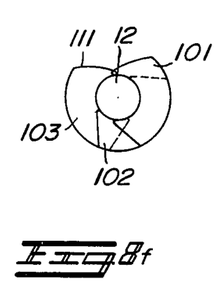

In FIG. 8E the lower crescent 103 has rotated to the point where an end wall of lower crescent slot 106 forcibly engages the middle crescent pin 104. This causes the middle crescent to begin rotating in the reverse drive direction. FIG. 8F illustrates the relative crescent positions.

Figure 8G:
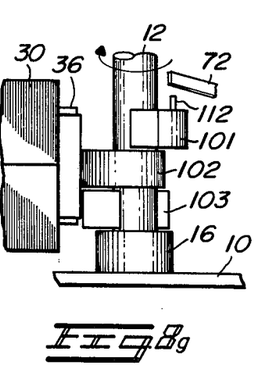
Figure 8H:
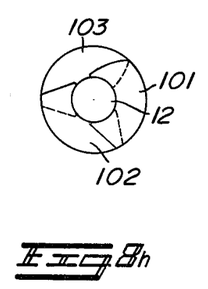

In FIG. 8G the lower and middle crescents have rotated to the point where an end wall of the middle crescent slot 107 forcibly engages the upper crescent pin 105. At this point the upper crescent begins rotating in a reverse direction. As seen in FIG. 8hH, the relative positions of the pins in slots causes the crescents to form a substantially circular configuration when viewed downwardly from a horizontal plane located above the axis of the capstan.

Figure 8I:
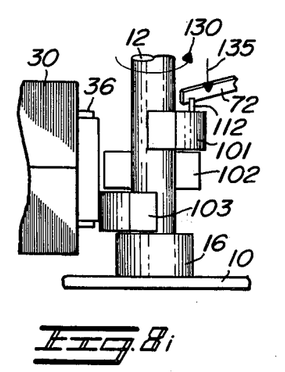
Figure 8J:
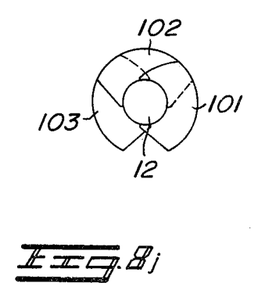

FIG. 8I illustrates a return from the fast reverse mode to the normal mode. Here note the capstan direction is again reversed, being driven in the forward direction as illustrated by arrow 130. Also, the control arm is relocated in a direction indicated by arrow 135 to engage the upper crescent upwardly extending pin 112. This of course realigns the upper crescent such that the capstan surface is revealed to the pressure roller. FIG. 8J shows the relative crescent positions, as the system returns to a normal mode.

Figure 8K:
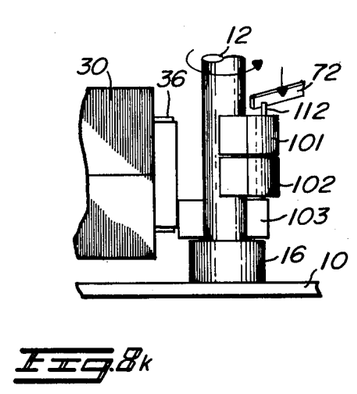
Figure 8L:
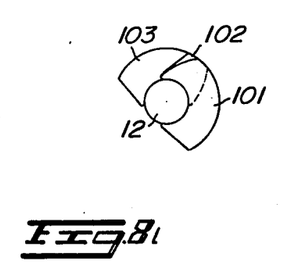
Figure 8M:
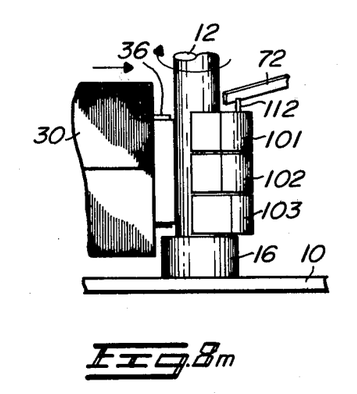
Figure 8N:
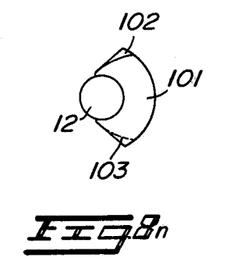

FIG. 8K illustrates the second crescent 102 returning to its rest position as is further illustrated in FIG. 8L. Finally, in FIGS. 8M and 8N it is seen that the third and final crescent 103 has returned to its rest position, and that the cartridge has relocated such that the pressure roller is in contacting relation to the capstan.

Thus a continuous loop cartridge-tape player system has been shown which is operable in modes of fast forward and reverse. The fast modes of operation do not require an increased speed of rotation of the motor, thus motor wear is minimized. While preferred embodiments of the invention have been illustrated, countless variations thereof are possible all of which fall within the true spirit and scope of the invention.

I claim:
1. A reversible continuous loop tape drive mechanism comprising,
   a rotatably mounted hub means,
   a rotatably mounted driven means,
   a primary drive means, forcibly engaging the driven means, and operable to rotate the driven means in a forward or reverse direction,
   a continuous tape loop wound about the hub,
   means for guiding the tape between the driven means and the primary drive means at the engaging interface for driving the tape in a forward or reverse direction,
   wherein the improvement comprises
   a secondary drive means operable to transfer rotational drive from the driven means to the hub when the primary drive means is operating the driven means in the reverse direction, the secondary drive means otherwise effectively decoupling the driven means for the hub.
2. The mechanism of claim 1 in a tape cartridge-player system wherein
   the hub rides on a spindle in the base of the cartridge,
   the driven means comprises a pressure roller located in the front access of the tape cartridge,
   the primary drive means comprises a capstan shaft driven off of a motor activated flywheel, and
   the guide means further guides the tape past tape heads in the tape player.
3. The mechanism of claim 2 wherein the secondary drive means includes
   a first pulley of predetermined diameter affixed to rotate with the driven means,
   a second pulley of predetermined diameter,
   a clutch coupling the hub to the second pulley, the clutch connecting the second pulley to the hub such that the pulley rotates with the hub when driven in the reverse direction, the clutch otherwise disconnecting the second pulley from the hub,
   an elastic ring extended to ride in the pulleys whereby rotation of the first pulley effects rotation in the second pulley.
4. A combination fast forward, and reverse continuous loop tape cartridge and player comprising
   a cartridge housing having a base portion and a front wall portion, the front wall portion provided with a front access cavity,
   a hub means rotatably located on the base,
   a pressure roller rotatably located on the base and engagably accessible through the front access to be rotatably driven in a forward or reverse direction,
   a continuous tape loop wound on the hub, routed around the pressure roller to be driven therewith, the tape being driven in the forward direction by being removed from the hub means at the inner convolution and returned to the hub means at the outer convolution,
   a player housing provided with a cartridge receiving cavity,
   a cylindrical capstan rotatably driven in a forward or reverse direction about its longitudinal axis by a motor actuated flywheel, the longitudinal axis in a vertical plane and predeterminedly positioned to rotatably engage the pressure roller of a received cartridge,
   wherein the improvement comprises means coupling the rotational movement of the pressure roller to the hub when the pressure roller is driven in the reverse direction and decoupling the rotational movement of the pressure roller from the hub when the pressure roller is driven in the forward direction, a plurality of crescents rotatable about the capstan, each crescent having an inner face, an outer face and a vertical dimension, the inner face encircling greater than 180° of the capstan circumference while revealing a substantial arc on the capstan surface, the outer face of predetermined curvature, the vertical height predeterminedly fixed, means operable in a first mode to decouple capstan rotation from the crescents, and operable in a second mode to rotatably connect the crescents to the capstan, means operable in the first mode to align the crescents such that the capstan surface is forcibly engagable by the pressure roller, and operable in the second mode to sequentially align the crescents such that the outer faces form a substantially circular configuration as viewed from a point above the axis of the capstan, means for selecting either the first or second mode.

5. A cartridge tape player comprising
a housing provided with a cartridge receiving cavity,
a cylindrical capstan rotatably driven about its longitudinal axis by a motor actuated flywheel, the longitudinal axis in a vertical plane and predeterminedly positioned to forcibly engage a received cartridge,
wherein the improvement comprises
a plurality of crescents rotatable about the capstan, each crescent having an inner face, an outer face and a vertical dimension, the inner face encircling greater than 180° of the capstan circumference while revealing a substantial arc on the capstan surface, the outer face of predetermined curvature, the vertical height predeterminedly fixed,
means operable in a first mode to decouple capstan rotation from the crescents, and operable in a second mode to rotatably connect the crescents to the capstan,
means operable in the first mode to align the crescents such that the capstan surface is forcibly engagable by the pressure roller, and operable in the second mode to sequentially align the crescents such that the outer faces form a substantially circular configuration as viewed from a point above the axis of the capstan,
means for selecting either the first or second mode.

6. The player of claim 5 having at least two crescents and further comprising
a support means adjoining the capstan at a predetermined position,
the second crescent slidably mounted on the capstan and vertically supported by the support means,
the first crescent slidably mounted on the capstan and vertically supported by the second crescent.

7. The player of claim 6 wherein the aligning means includes a pin affixed to the bottom surface of the first crescent and extending downwards therefrom, and
a slot located in the top surface of the second crescent, the slot of predetermined curvature to allow passage of the pin,
and having predeterminedly positioned end walls suitable for forcibly engaging the pin.

8. The player of claim 7 wherein the crescents are of identical dimensions and the first crescent is rotatable 180° out of alignment with the second crescent before the pin engages an end wall.

9. The player of claim 7 wherein the decoupling means comprises a movable stop member and a spring having first and second ends and a plurality of turns of given diameter, the turns located about the capstan, the first end forcibly engaging the first crescent, the second end operably engagable with a movable stop member,
whereby under the action of friction between the capstan and the inner face the spring diameter increases to slide on the capstan when the second end engages the stop member, otherwise the spring diameter decreasing to clutch the capstan and rotate therewith.

10. The player of claim 9 wherein the selecting means includes a lever, spring loaded to rest in the first mode, and manually operable via a pushbutton located on the front of the player to the second mode, the lever locating the stop member to disengage the spring second end when the lever is operated to the second mode, the lever otherwise locating the stop member to engage the second end.

11. The player of claim 5 with the capstan rotatable in either a forward or reverse direction having three crescents, and further comprising
a support means adjoining the capstan at a predetermined position,
the lower crescent further provided with a graded engaging face suitable for forcibly engaging the pressure roller when the capstan is driven in the reverse direction, the lower crescent slidably mounted on the capstan and vertically supported by the support means,
the middle crescent slidably mounted on the capstan and vertically supported by the lower crescent,
the upper crescent, further provided with a graded engaging face suitable for forcibly engaging the pressure roller when the capstan is driven in the forward direction, the upper crescent slidably mounted on the capstan and vertically supported by the middle crescent.

12. The player of claim 11 wherein the aligning means includes
a first pin extending downwards from the bottom surface of the middle crescent,
a first slot located in the top surface of the lower crescent to allow passage of the pin, and having predeterminedly positioned end walls for forcibly engaging the first pin,
a second pin extending downwards from the bottom surface of the upper crescent,
a second slot located in the top surface of the middle crescent, the slot of predetermined curvature to allow passage of the pin and having predeterminedly positioned end walls for forcibly engaging the second pin.

13. The player of claim 12 wherein in the second mode with the capstan forwardly driven the first pin engages a first slot end wall when the upper crescent leads the middle crescent by 120°, and the second pin engages a second slot end wall when the second crescent leads the lower crescent by 120°.

14. The player of claim 12 wherein in the second mode with the capstan reversely driven the second pin engages a second slot end wall when the lower crescent leads the middle crescent by 120°, and the first pin engages a first slot end wall when the middle crescent leads the upper crescent by 120°.

15. The player of claim 12 wherein the aligning means and decoupling means further comprises a stop pin extending from the upper surface of the upper crescent, a manually actuated lever operable in the first mode to engage the stop pin at a predetermined upper crescent position and operable in the second mode to disengage the stop pin.

16. The player of claim 15 wherein the selecting means includes a manually operable pushbutton accessible from the front of the player coupled to the lever, the rest position of the pushbutton locating the lever in the first mode, manual activation of the pushbutton locating the lever in the second mode.

17. A player for a tape cartridge operable in a fast forward mode comprising
a player housing provided with a cartridge receiving cavity,
a cylindrical capstan, located in the housing, rotatably driven off of a motor activated flywheel, having its longitudinal axis substantially vertical, and positioned to forcibly engage the pressure roller of an inserted cartridge,
wherein the improvement comprises
a pair of crescents, each having a convex face, a concave face, and a vertical dimension, the concave face defined by a predetermined diameter, the convex face formed to encircle greater than 180° of the capstan circumference while revealing a substantial portion of the capstan circumference,
the vertical dimension predeterminedly fixed,
a support means adjoining the capstan at a predetermined position,
the second crescent slidably mounted on the capstan and vertically supported by the support means,
the first crescent slidably mounted on the capstan and vertically supported by the second crescent,
means operable to clutch the first crescent to the capstan for rotation therewith in the fast forward mode, and
means interconnecting the first and second crescents at predetermined relative crescent positions,
whereby in the fast forward mode the crescents increase the effective diameter of the capstan.

18. The player of claim 17 further comprising a movable stop member and wherein the clutch comprises a spring having first and second ends and a plurality of turns of given diameter, the turns located about the capstan, the first end forcibly engaging the first crescent, the second end operably engagable with a movable stop member,
whereby the spring diameter increases to slide on the capstan when the first end engages the stop member.

19. The player of claim 18 wherein the stop member is normally located in a first position engaging the first end and is manually operable to a second position out of engagement from the first end.

20. The player of claim 17 wherein the interconnecting means includes a pin affixed to the bottom surface of the first crescent and extending downwards therefrom, and
a slot located in the top surface of the second crescent, the slot of predetermined curvature to allow passage of the pin,
and having predeterminedly positioned end walls suitable for forcibly engaging the pin.

21. The player of claim 20 wherein the crescents are of identical dimensions and the first crescent is rotatable 180° out of alignment with the second crescent before the pin engages an end wall.

22. A player for a tape cartridge operable in fast forward or fast reverse modes comprising
a player housing provided with a cartridge receiving cavity,
a cylindrical capstan, located in the housing, rotatably driven in a forward or reverse direction off of a motor activated flywheel, having its longitudinal axis substantially vertical, and positioned to forcibly engage the pressure roller of an inserted cartridge,
wherein the improvement comprises
a trio of crescents, each having a convex face, a concave face, and a vertical dimension, the convex face defined by a predetermined diameter, the concave face formed to encircle greater than 180° of the capstan circumference while revealing a substantial portion of the capstan surface,
the vertical dimension predeterminedly fixed,
a support means adjoining the capstan at a predetermined position,
the lower crescent slidably mounted on the capstan and vertically supported by the support means, and further provided with a graded engaging face suitable for forcibly engaging the pressure roller when the capstan is driven in the reverse direction,
the middle crescent slidably mounted on the capstan and vertically supported by the lower crescent,
the upper crescent slidably mounted on the capstan and vertically supported by the middle crescent, and further provided with a graded engaging face suitable for forcibly engaging the pressure roller when the capstan is driven in the forward direction,
means in a first mode to align the crescents such that the pressure roller engages the revealed surface of the capstan, and operable in a second mode to allow crescent engagement with the pressure roller, and
means operable to rotatably interconnect the crescents in a predetermined configuration such that the concave faces form a circular configuration about the capstan during crescent rotation.

23. The player of claim 22 wherein the interconnecting means includes
a first pin extending downwards from the bottom surface of the middle crescent,
a first slot located in the top surface of the lower crescent, the slot of predetermined curvature to allow passage of the pin, and having predeterminedly positioned end walls for forcibly engaging the first pin, p1 a second pin extending downwards from the bottom surface of the upper crescent,
a second slot located in the top surface of the middle crescent, the slot of predetermined curvature to allow passage of the pin, and having predeterminedly positioned end walls for forcibly engaging the second pin.

24. The player of claim 23 wherein in the second mode with the capstan forwardly driven the first pin engages a first channel end wall when the upper crescent leads the middle crescent by 120°, and the second pin engages a second channel end wall when the second crescent leads the lower crescent by 120°.

25. The player of claim 23 wherein in the second mode with the capstan reversely driven the second pin engages a second channel end wall when the lower crescent leads the middle crescent by 120°, and the first pin engages a first channel end wall when the middle crescent leads the upper crescent by 120°.

26. The player of claim 23 wherein the aligning means includes a stop pin extending from the upper surface of the upper crescent, a manually activated lever operable in the first mode to engage the stop pin at a predetermined upper crescent position and operable in the second mode to disengage the stop pin.

27. The player of claim 26 wherein the lever is spring loaded to rest in the first mode, and is manually operable to the second mode via a pushbutton located on the front of the player.

* * * * *